US008516144B2

(12) United States Patent
Hsu

(10) Patent No.: US 8,516,144 B2
(45) Date of Patent: Aug. 20, 2013

(54) STARTUP BITRATE IN ADAPTIVE BITRATE STREAMING

(75) Inventor: James Kong Hsu, Redwood City, CA (US)

(73) Assignee: CBS Interactive Inc., San Francisco, CA (US)

( * ) Notice: Subject to any disclaimer, the term of this patent is extended or adjusted under 35 U.S.C. 154(b) by 71 days.

(21) Appl. No.: 13/098,236

(22) Filed: Apr. 29, 2011

(65) Prior Publication Data

US 2012/0278496 A1    Nov. 1, 2012

(51) Int. Cl.
*G06F 15/16*    (2006.01)

(52) U.S. Cl.
USPC .......................................... 709/231; 709/232

(58) Field of Classification Search
USPC .................................................. 709/231, 232
See application file for complete search history.

(56) References Cited

U.S. PATENT DOCUMENTS

| 7,440,674 | B2 | 10/2008 | Plotnick et al. | |
|---|---|---|---|---|
| 7,480,635 | B2 | 1/2009 | Saar et al. | |
| 7,831,469 | B2 | 11/2010 | Bhakta et al. | |
| 7,987,285 | B2 * | 7/2011 | Melnyk et al. | 709/233 |
| 7,991,904 | B2 * | 8/2011 | Melnyk et al. | 709/230 |
| 2006/0041593 | A1 | 2/2006 | Borthakur et al. | |
| 2006/0155814 | A1 | 7/2006 | Bennett et al. | |
| 2007/0157295 | A1 | 7/2007 | Mangalore et al. | |
| 2008/0052323 | A1 | 2/2008 | Dodge et al. | |
| 2008/0086505 | A1 | 4/2008 | McKellar et al. | |
| 2008/0144604 | A1 | 6/2008 | Sharma et al. | |
| 2009/0019178 | A1 * | 1/2009 | Melnyk et al. | 709/233 |
| 2009/0254657 | A1 * | 10/2009 | Melnyk et al. | 709/224 |
| 2010/0135473 | A1 | 6/2010 | Dewing et al. | |
| 2011/0035462 | A1 | 2/2011 | Akella | |
| 2011/0282921 | A1 | 11/2011 | Dodge | |
| 2012/0054045 | A1 | 3/2012 | Beining et al. | |
| 2012/0059697 | A1 | 3/2012 | Lin et al. | |
| 2012/0185473 | A1 | 7/2012 | Ponting et al. | |

* cited by examiner

*Primary Examiner* — Kristie Shingles
(74) *Attorney, Agent, or Firm* — Fenwick & West LLP

(57) ABSTRACT

Streaming media at an adaptive bitrate streaming media player. Tracking a bitrate history of the player. Determining a startup bitrate from the bitrate history. Streaming at the determined bitrate. Tracking a bitrate history of the player can include storing tracked bitrates in a cookie accessible by the player; and determining a startup bitrate can include determining a startup bitrate from the cookie. Determining a startup bitrate can include determining an average tracked bitrate over the last N tracked bitrates. The average tracked bitrate can be weighted toward more recent tracked bitrates. Determining a startup bitrate can include determining a maximum startup bitrate. The bitrate history can include the maximum bitrate of the player over the last X sessions; and the maximum startup bitrate can be the lowest maximum bitrate over the last X sessions. The maximum startup bitrate can be the mode among maximum bitrates over the last X sessions.

21 Claims, 3 Drawing Sheets

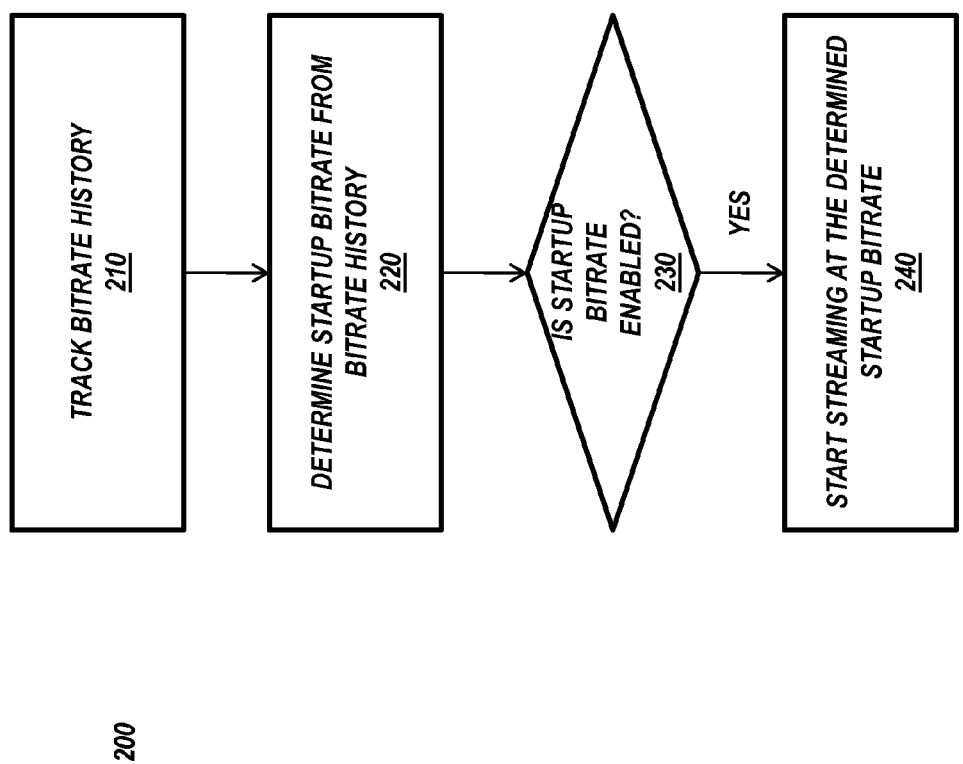

STARTUP BITRATE IN ADAPTIVE BITRATE STREAMING

CROSS REFERENCE TO RELATED APPLICATIONS

The present application claims the benefit of U.S. Provisional Application No. 61/377,210, filed Aug. 26, 2010, the disclosure of which is hereby incorporated herein in its entirety by reference (hereinafter "the '210 application").

FIELD OF THE TECHNOLOGY

The technology disclosed herein relates to on-line audio media and audiovisual media, hereinafter "on-line media." In exemplary embodiments, the technology relates to decreasing the time from a play request to playing of streaming media transported under HTTP Live Streaming (HLS) and similar protocols.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure, and are not therefore to be considered to be limiting of its scope, the principles herein are described and explained with additional specificity and detail through the use of the accompanying drawings in which:

FIG. 2 illustrates methods of the technology.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

Figure 1A:
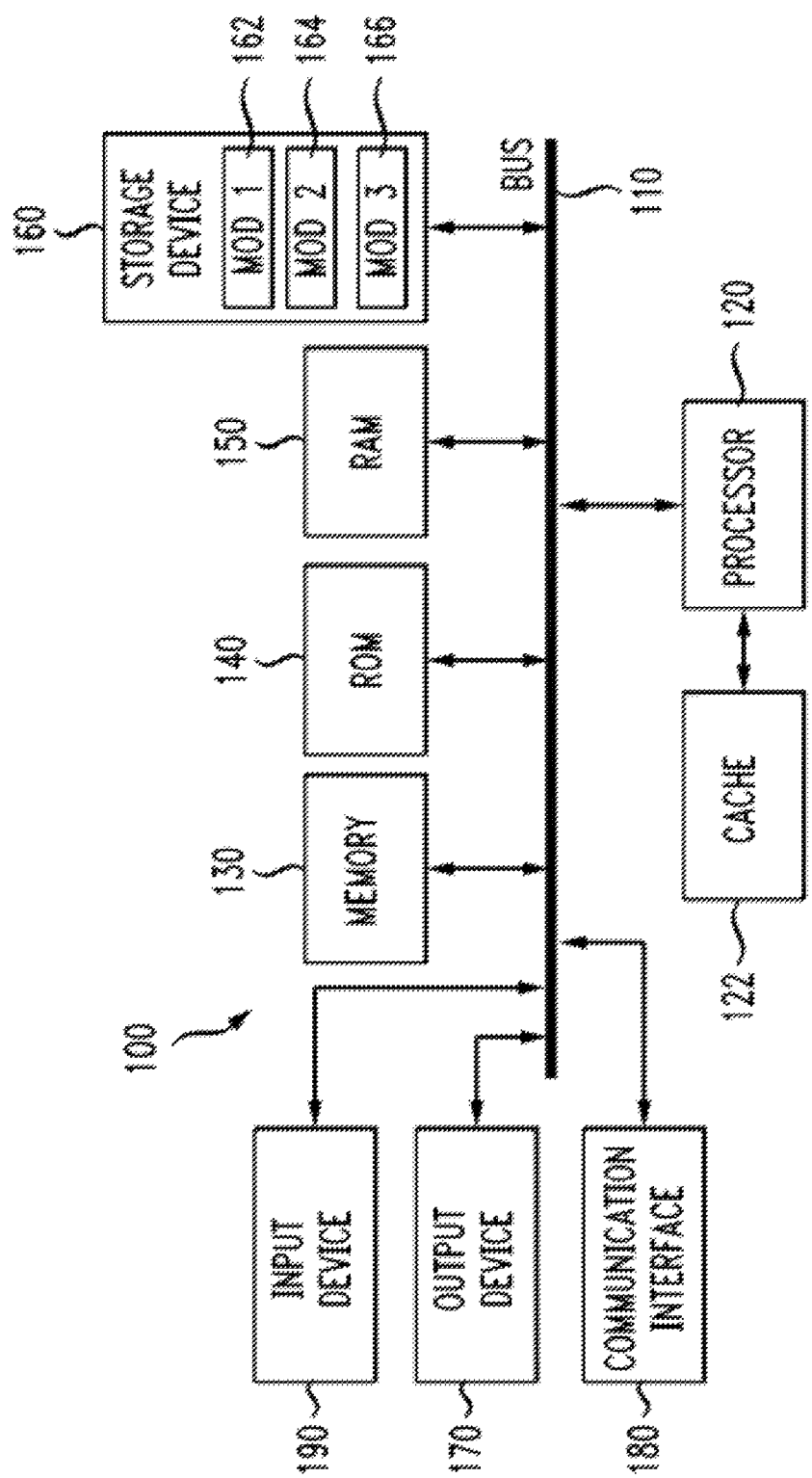
FIG. 1A illustrates an example system implementation.

With reference to FIG. 1A, an exemplary system 100 includes a general-purpose computing device 100, including a processing unit (CPU or processor) 120 and a system bus 110 that couples various system components including the system memory 130 such as read-only memory (ROM) 140 and random-access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general-purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160, such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although some implementations employ the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touchsensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement, and therefore, the basic features here may easily be substituted for improved hardware or firmware arrangements as they are developed.

For clarity of explanation, the illustrative system embodiment is presented as including individual functional blocks, including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as equivalent to software executing on a general-purpose processor. For example the functions of one or more processors presented in FIG. 1A may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry, in combination with a general purpose DSP circuit, may also be provided.

The logical operations of the various embodiments are implemented as: (1) a sequence of computer implemented steps, operations, or procedures (generally "instructions") running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1A can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1A illustrates three modules Mod1 162, Mod2 164 and Mod3 166 which are modules configured to control the processor 120. These modules may be stored on the storage device 160 and loaded into RAM 150 or memory 130 at runtime, or may be stored as would be known in the art in other computer-readable memory locations.

Content delivery describes the delivery of media "content" such as audio or video or computer software and games over a delivery medium such as broadcasting or the Internet. Content delivery has two parts: delivery of finished content for digital distribution, with its accompanying metadata; and delivery of the end product to the end-user.

Streaming media is media that is received by and presented to an end-user while being delivered by a streaming provider. The name refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming will be referred to as "media" and "streaming." The verb 'to stream' is also derived from this term, meaning to deliver media in this manner. Internet television is a commonly streamed medium.

Adaptive Bitrate Streaming (or Adaptive Streaming) is a technique used in streaming media. While other streaming technologies utilize protocols such Real Time Streaming Protocol (RTSP), adaptive streaming is primarily based on HTTP to work over networks such as the Internet. Adaptive streaming technology can detect a playback device bandwidth and other factors in real time and adjust the quality of a video stream accordingly. It typically involves the use of an encoder that encodes a single source video at multiple bit rates. The player switches between streaming the different bitrates depending on available resources. Post-production houses, content delivery networks, and studios use adaptive bit rate technology to provide higher quality video using less manpower and fewer resources.

Versions of adaptive bit rate streaming are used by Adobe Systems, Apple, Microsoft, and Octoshape. Both Adobe Flash Player and Flash Media Server support adaptive bit-rate streaming over the traditional RTMP protocol, as well as HTTP, similar to the HTTP-based solutions from Apple and Microsoft. HTTP-based streaming has the advantage of not requiring firewall ports being opened outside of the normal ports used by web browsers. HTTP-based streaming also allows video fragments to be cached by browsers, proxies, and CDNs. Apple's implementation of HTTP streaming, Http Live Streaming (HLS) is provided as part of their Quick-Time X, and iPhone software systems. Apple's newly released iPad also employs HLS. HLS works by breaking down streams into multiple small HTTP-based file downloads that load at variable adaptive rates. HTTP adaptive bit rate streaming is based on HTTP progressive download, but contrary to the previous approach, here the files are very small, so that they can be compared to the streaming of packets, much like the case of using RTSP and RTP.

Smooth Streaming is an Internet Information Services (IIS) media services extension that enables adaptive streaming of media to clients over HTTP. The format specification is based on the ISO Base Media File Format and standardized by Microsoft as the Protected Interoperable File Format. Microsoft provides Smooth Streaming Client software development kits for Silver-light and Windows Phone 7. IIS Media Services 4.0, released in November 2010, introduced a feature which enables Smooth Streaming H.264/AAC videos, both live and on-demand, to be dynamically repackaged into the HLS format and delivered to iOS devices without the need for re-encoding. Octoshape's technology supports adaptive bitrate streaming using formats like Flash, Windows and HLS. Ocotoshape's technology selects bit rates on startup, but rarely makes use of the rate shifting technology during a viewing session.

Figure 1B:
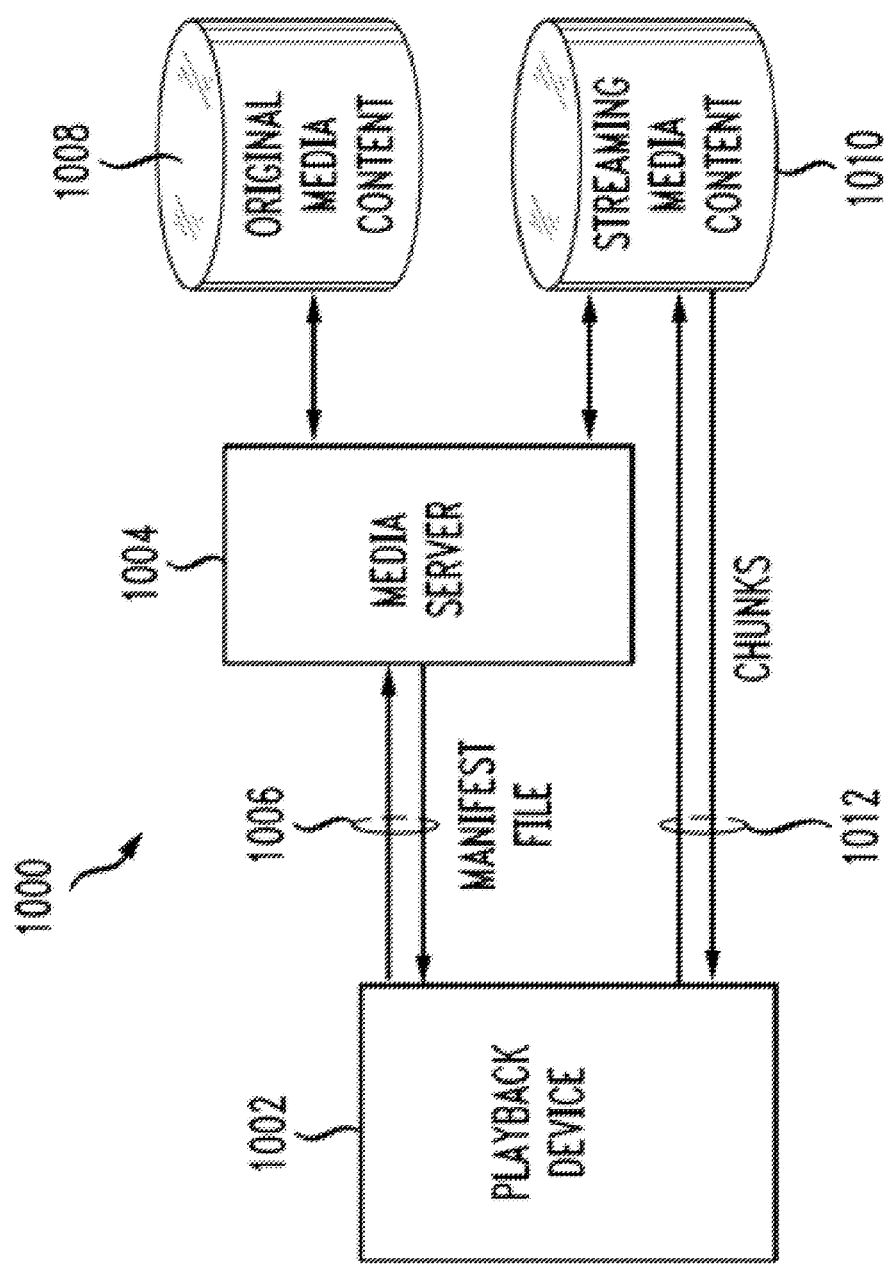
FIG. 1B illustrates an example media streaming system implementation.

Having disclosed some components of a computing system, the disclosure now turns to FIG. 1B, which illustrates an example media streaming system embodiment 1000. The communications between the entities depicted in FIG. 1B can occur via one or more wired or wireless networks. Further, the devices can communicate directly, via the World Wide Web, or via an application programming interface (API). A playback device 1002, such as a tablet device, smartphone, desktop or portable computer, set-top box, Internet-enabled television, media center PC, or any other suitable device, first makes a request to a media server 1004 for playback of media content, such as an episode of Star Trek. Typically, the media server 1004 resides in a network, such as the Internet, but can reside entirely or partially in any of the playback devices or a local network, for example.

In HLS, the media server 1004 receives the request and generates or fetches a manifest file 1006 to send to the playback device 1002 in response to the request. Example formats for the manifest file 1006 include the m3u and m3u8 formats. An m3u8 file is a specific variation of an m3u encoded using UTF-8 Unicode characters. The m3u file format was initially used in the WINAMP Media Player for only audio files, but has since become a de facto playlist standard on many media devices for local and/or streaming media, including music and other media types. Many media devices employ variations of the m3u file format, any of which can be used according to the principles set forth herein. A manifest file can include links to media files as relative or absolute paths to a location on a local file system, or as a network address, such as a Uniform Resource Identifier (URI) path. The m3u8 format is used herein as a non-limiting example to illustrate the principles of manifest files.

In telecommunications and computing, bitrate (sometimes written "bit rate," "data rate") is the number of bits conveyed or processed per unit of time. The bit rate is quantified using the bits per second (bit/s or bps) unit, often in conjunction with an SI prefix such as kilo- (kbit/s or kbps), mega- (Mbit/s or Mbps), giga- (Gbit/s or Gbps) or tera- (Tbit/s or Tbps). Note that, unlike many other computer-related units, 1 kbit/s is traditionally defined as 1,000 bit/s, not 1,024 bit/s, etc.

In digital multimedia, bit rate can refer to the number of bits used per unit of playback time to represent a continuous medium such as audio or video after source coding (data compression). The encoding bit rate of a multimedia file is the size of a multimedia file in bytes divided by the playback time of the recording (in seconds), multiplied by eight. In case of real time streaming multimedia, the encoding bit rate is the goodput that is required to avoid interrupts.

Goodput or data transfer rate refers to the achieved average net bit rate that is delivered to the application layer, exclusive of all protocol overhead, data packets retransmissions, etc. For example, in the case of file transfer, the goodput corresponds to the achieved file transfer rate. The file transfer rate in bit/s can be calculated as the file size (in bytes), divided by the file transfer time (in seconds), and multiplied by eight.

By default the typical starting bitrate for adaptive bitrate streaming is the lowest bitrate in the dynamic profile set. This means that each playback device starts playing at the lowest bitrate. The playback device then switches to a higher bitrate as conditions allow. However, the time that it takes to switch to a higher bitrate from the initial bitrate can be as long as fifteen (15) seconds.

One problem with this approach is that under the initial bitrate, some playback devices will be playing a lower quality video than what the current bandwidth to that device allows. Users have a finite tolerance for slow streaming and will abandon streams that are perceived slow. This consequence is avoidable where the bandwith to support a higher bitrate is available. Conversely, it is important to start playback devices with consistently lower communications bandwidths with a starting video bitrate that will stream properly for those devices.

Referring to FIG. 2, methods 200 of the technology are illustrated. In such methods, the technology can track the bitrate history 210 of the player over time. Tracking the bitrate history of the player can include one or more of: updating the history; sampling the bitrate either periodically or aperiodically. It can also include tracking the bitrate on player startup; tracking the bitrate on a per session basis; and averaging the bitrate over a period. For example, where the bitrate is averaged over a period, the periods can be every fifteen (15) seconds for the first minute of play, and then every minute thereafter with just the average over each period tracked.

Tracked bitrate values can be stored in a cookie on the player device. Bitrate tracking can be performed by the player, or can be performed elsewhere, e.g., in a Content Management System (CMS). In a player such as the player disclosed in the '210 application, the player can obtain the bitrate history from the player skin. Bitrate history can also be user dependent.

With the bitrate history available, the technology can determine a starting bitrate from the bitrate history 220. The technology can use the most recent bitrate as the startup bitrate. The technology can apply a function to a plurality of rates to determine the startup bitrate. For example, the function can be the average bitrate over the last N tracked bitrates, over the last X time period, or a combination of both. The average can be weighted, e.g., to give more weight to more recent bitrates. The function can be the statistical mode among tracked bitrates. The function can be related to the maximum bitrate in each of the last N sessions, e.g., the lowest max bitrate over the last five (5) sessions. In some implementations, other factors can be used in determining the startup bitrate including the nature of the player hardware, the duration of the content to be streamed, . . . .

The starting bitrate can be capped, e.g., to account for users who change location between a higher bandwidth environment and a lower bandwidth environment. For example, a higher bandwidth environment can be a home at 5 Mbps or an office at 20 Mbps; while a lower bandwidth environment can be a public space such as WiFi in a coffee shop at 1.5 Mbps or lower. In implementations where a capped startup bitrate is used, the technology can determine a first bitrate as described above, and then compare the first determined bitrate with the cap, using the lower of the two. The same approach can be used for minimum starting bitrate.

The technology can determine if streaming according to the determined bitrate is enabled 230. A bitrate memory enabled flag can be used to indicate if streaming according to the determined bitrate is enabled. While shown as following the determine bitrate from bitrate history 220 step, determining if the bitrate memory flag is enabled can be a precondition to any other step of the technology. If the bitrate memory enabled flag (when used) is set, the technology can initiate streaming according to the determined bitrate 240.

The invention claimed is:

1. A computer-implemented method for providing streaming media to an adaptive bitrate streaming media player, the method comprising:

providing streaming media content to the adaptive bitrate streaming media player executing on a client device, the streaming media content being provided according to a variable bitrate that varies over time;

during playback of media content on the adaptive bitrate streaming media player, determining bitrate values used at a plurality of different times for providing the streaming media content to the adaptive bitrate streaming media player;

tracking a bitrate history of the player, the tracking comprising storing the one or more determined bitrate values determined for the plurality of different times during the playback of the media content;

storing the tracked bitrate history in a cookie accessible by the adaptive bitrate streaming media player;

responsive to receiving a request from the adaptive bitrate streaming media player for streaming media content, retrieving the tracked bitrate history from the cookie;

determining a startup bitrate based on the bitrate history, the startup bitrate comprising an initial bitrate for streaming the media content to the adaptive bitrate streaming media player;

storing the determined startup bitrate in the cookie accessible by the adaptive bitrate streaming media player; and streaming media content to the adaptive bitrate streaming media player, wherein the streaming begins at the determined startup bitrate.

2. The method of claim 1, wherein determining a startup bitrate based on the bitrate history comprises:
determining an average tracked bitrate over the last N tracked bitrates.

3. The method of claim 2, wherein the determined average tracked bitrate is weighted toward more recent tracked bitrates.

4. The method of claim 1, wherein determining a startup bitrate from the bitrate history comprises:
determining a first startup bitrate for streaming the media content to the adaptive bitrate media player; and
determining a maximum startup bitrate for streaming the media content to the adaptive bitrate media player, the maximum startup bitrate based on a bandwidth environment.

5. The method of claim 4 wherein:
tracking a bitrate history of the player comprises tracking a maximum bitrate of the adaptive bitrate streaming media player for each session over the last X media content streaming sessions;
determining a maximum startup bitrate comprises determining the lowest maximum bitrate from the maximum bitrates tracked by the bitrate history over the last X media content streaming sessions; and
streaming at the determined bitrate comprises streaming at the lower of the determined first startup bitrate and the determined maximum startup bitrate.

6. The method of claim 4 wherein:
tracking a bitrate history of the player comprises tracking a maximum bitrate of the adaptive bitrate streaming media player for each session over the last X media content streaming sessions; and
determining a maximum startup bitrate comprises determining the mode among maximum bitrates from the maximum bitrates tracked by the bitrate history over the last X media content streaming sessions;
streaming at the determined bitrate comprises streaming at the lower of the determined first startup bitrate and the determined maximum startup bitrate.

7. The method of claim 1, wherein the tracking of a bitrate history comprises one of more of the following: sampling the bitrate at a periodic or aperiodic interval, recording the bitrate on player startup, recording the bitrate on a per session basis or averaging the bitrate over a period of time.

8. A non-transitory computer-readable storage medium for providing streaming media to an adaptive bitrate streaming media player, the non-transitory computer-readable storage medium storing instructions that when executed by a processor cause the processor to:
provide streaming media content to the adaptive bitrate streaming media player executing on a client device, the streaming media content being provided according to a variable bitrate that varies over time
during playback of media content on the adaptive bitrate streaming media player, determine bitrate values used at a plurality of different times for providing the streaming media content to the adaptive bitrate streaming media player;
track a bitrate history of the player, the tracking comprising storing the one or more determined bitrate values determined for the plurality of different times during the playback of the media content;
store the tracked bitrate history in a cookie accessible by the adaptive bitrate streaming media player;
responsive to receiving a request from the adaptive bitrate streaming media player for streaming media content, retrieve the tracked bitrate history from the cookie;
determine a startup bitrate based on the bitrate history, the startup bitrate comprising an initial bitrate for streaming the media content to the adaptive bitrate streaming media player;
store the determined startup bitrate in the cookie accessible by the adaptive bitrate streaming media player; and
stream media content to the adaptive bitrate streaming media player, wherein the streaming begins at the determined startup bitrate.

9. The computer-readable storage medium of claim 8, wherein determining a startup bitrate based on the bitrate history comprises:
determining an average tracked bitrate over the last N tracked bitrates.

10. The computer-readable storage medium of claim 9, wherein the determined average tracked bitrate is weighted toward more recent tracked bitrates.

11. The computer-readable storage medium of claim 8, wherein determining a startup bitrate from the bitrate history comprises:
determining a first startup bitrate for streaming the media content to the adaptive bitrate media player; and
determining a maximum startup bitrate for streaming the media content to the adaptive bitrate media player, the maximum startup bitrate based on a bandwidth environment.

12. The computer-readable storage medium of claim 11 wherein:
tracking a bitrate history of the player comprises tracking a maximum bitrate of the adaptive bitrate streaming media player for each session over the last X media content streaming sessions;
determining a maximum startup bitrate comprises determining the lowest maximum bitrate from the maximum bitrates tracked by the bitrate history over the last X media content streaming sessions; and
streaming at the determined bitrate comprises streaming at the lower of the determined first startup bitrate and the determined maximum startup bitrate.

13. The computer-readable storage medium of claim 11 wherein:
tracking a bitrate history of the player comprises tracking a maximum bitrate of the adaptive bitrate streaming media player for each session over the last X media content streaming sessions;
determining a maximum startup bitrate comprises determining the mode among maximum bitrates from the maximum bitrates tracked by the bitrate history over the last X media content streaming sessions; and
streaming at the determined bitrate comprises streaming at the lower of the determined first startup bitrate and the determined maximum startup bitrate.

14. The computer program product of claim 8, wherein the tracking of a bitrate history comprises one of more of the following: sampling the bitrate at a periodic or aperiodic interval, recording the bitrate on player startup, recording the bitrate on a per session basis or averaging the bitrate over a period of time.

15. A system for processing streaming media at an adaptive bitrate streaming media player, the system comprising:
a processor, and
a non-transitory computer-readable storage medium storing instructions that when executed by the processor cause the processor to:
provide streaming media content to the adaptive bitrate streaming media player executing on a client device, the streaming media content being provided according to a variable bitrate that varies over time during playback of media content on the adaptive bitrate streaming media player, determine bitrate values used at a plurality of different times for providing the streaming media content to the adaptive bitrate streaming media player;

track a bitrate history of the player, the tracking comprising storing the one or more determined bitrate values determined for the plurality of different times during the playback of the media content;

store the tracked bitrate history in a cookie accessible by the adaptive bitrate streaming media player;

responsive to receiving a request from the adaptive bitrate streaming media player for streaming media content, retrieve the tracked bitrate history from the cookie;

determine a startup bitrate based on the bitrate history, the startup bitrate comprising an initial bitrate for streaming the media content to the adaptive bitrate streaming media player;

store the determined startup bitrate in the cookie accessible by the adaptive bitrate streaming media player; and stream media content to the adaptive bitrate streaming media player, wherein the streaming begins at the determined startup bitrate.

16. The system of claim 15, wherein determining a startup bitrate based on the bitrate history comprises:
determining an average tracked bitrate over the last N tracked bitrates.

17. The system of claim 16, wherein the determined average tracked bitrate is weighted toward more recent tracked bitrates.

18. The system of claim 15, wherein determining a startup bitrate from the bitrate history comprises:
determining a first startup bitrate for streaming the media content to the adaptive bitrate media player; and
determining a maximum startup bitrate for streaming the media content to the adaptive bitrate media player, the maximum startup bitrate based on a bandwidth environment.

19. The system of claim 18 wherein:
tracking a bitrate history of the player comprises tracking a maximum bitrate of the adaptive bitrate streaming media player for each session over the last X media content streaming sessions;
determining a maximum startup bitrate comprises determining the lowest maximum bitrate from the maximum bitrates tracked by the bitrate history over the last X media content streaming sessions; and
streaming at the determined bitrate comprises streaming at the lower of the determined first startup bitrate and the determined maximum startup bitrate.

20. The system of claim 18 wherein:
tracking a bitrate history of the player comprises tracking a maximum bitrate of the adaptive bitrate streaming media player for each session over the last X media content streaming sessions;
determining a maximum startup bitrate comprises determining the mode among maximum bitrates from the maximum bitrates tracked by the bitrate history over the last X media content streaming sessions; and
streaming at the determined bitrate comprises streaming at the lower of the determined first startup bitrate and the determined maximum startup bitrate.

21. The system of claim 15, wherein the tracking of a bitrate history comprises one of more of the following: sampling the bitrate at a periodic or aperiodic interval, recording the bitrate on player startup, recording the bitrate on a per session basis or averaging the bitrate over a period of time.

* * * * *

UNITED STATES PATENT AND TRADEMARK OFFICE
CERTIFICATE OF CORRECTION

PATENT NO.         : 8,516,144 B2
APPLICATION NO.    : 13/098236
DATED              : August 20, 2013
INVENTOR(S)        : James Kong Hsu Page 1 of 1

It is certified that error appears in the above-identified patent and that said Letters Patent is hereby corrected as shown below:

In the Claims:

Column 9, line 2 after "varies over time" insert --;--.

Signed and Sealed this
Third Day of June, 2014

Michelle K. Lee
*Deputy Director of the United States Patent and Trademark Office*